(12) United States Patent
Hogan (10) Patent No.: US 8,873,619 B1
(45) Date of Patent: Oct. 28, 2014

(54) CODEC ENCODER AND DECODER FOR VIDEO INFORMATION

(76) Inventor: Velvin R. Hogan, San Jose, CA (US)

(*) Notice: Subject to any disclaimer, the term of this patent is extended or adjusted under 35 U.S.C. 154(b) by 1456 days.

(21) Appl. No.: 12/212,220

(22) Filed: Sep. 17, 2008

Related U.S. Application Data (60) Provisional application No. 60/994,221, filed on Sep. 18, 2007.

(51) Int. Cl.
*G06F 21/00* (2013.01)
*H04N 19/00* (2014.01)
*H04N 19/527* (2014.01)

(52) U.S. Cl.
CPC ......... *H04N 19/00* (2013.01); *H04N 19/00593* (2013.01)
USPC ....... 375/240.01; 386/326; 386/327; 386/328

(58) Field of Classification Search
CPC ............ H04N 19/00; H04N 19/00593; H04N 19/00812
USPC .................................................. 386/326–328
See application file for complete search history.

(56) References Cited

U.S. PATENT DOCUMENTS

| | | | |
|---|---|---|---|
| 5,557,479 A * | 9/1996 | Yanagihara | 360/32 |
| 5,647,049 A * | 7/1997 | Odaka et al. | 386/247 |
| 6,876,813 B1 * | 4/2005 | Matsui | 386/230 |
| 2005/0089312 A1 * | 4/2005 | Shirakawa et al. | 386/111 |
| 2005/0117809 A1 * | 6/2005 | Mitchell et al. | 382/235 |
| 2007/0223870 A1 * | 9/2007 | Farling et al. | 386/46 |
| 2008/0120676 A1 * | 5/2008 | Morad et al. | 725/127 |

OTHER PUBLICATIONS

Chen et al., "Fully Utilized and Reusable Architecture for Fractional Motion Estimation of H.264/AVC", 2004, 4 pages.*

* cited by examiner

*Primary Examiner* — Thanhnga B Truong
*Assistant Examiner* — Thaddeus Plecha
(74) *Attorney, Agent, or Firm* — Kevin Roe (57) ABSTRACT

A codec for encoding and decoding video data capable of downloading streaming video and data contents from a number of different types of sources (e.g., antennas, cable, and computer networks). The video files may thereafter be retrieved, processed, and provided for viewing (e.g., on a standard television set, a high-definition television set, flat panel display, computer monitor, or an equivalent output device). One embodiment of the invention enables a user to download new coder/decoder (Codec) software.

18 Claims, 7 Drawing Sheets

CODEC ENCODER AND DECODER FOR VIDEO INFORMATION

CROSS-REFERENCE TO RELATED APPLICATIONS

This application claims priority from U.S. Provisional Patent Application Ser. No. 60/994,221, entitled "Codec Encoder and Decoder for Video Information," filed on Sep. 18, 2007, by the same inventor, which is incorporated by reference.

BACKGROUND OF THE INVENTION

The present invention relates generally to video systems, and more particularly, to a codec encoder and decoder for recording and storing video information.

Personal video recording and storage systems are known in the art. Such systems typically download streaming video to an internal fixed disk drive, which may thereafter be retrieved for viewing on demand. However, such systems typically have a small and limited storage capacity and can therefore only store a limited number of movies along with data contents. As can be seen, techniques that allow for recording, storage, and replay of a large number of video files are highly desirable.

SUMMARY OF THE INVENTION

Preferred embodiments of the invention provide a codec encoder and decoder for downloading streaming video and data contents from a number of sources and storing video files. The video files may thereafter be retrieved, processed, and provided for viewing on demand at a later time (e.g., on a standard television set, a high-definition 30 television set, flat panel display, computer monitor, or equivalent).

A first aspect of the invention is directed to a codec encoder module including a motion estimator module, a quantization module, and a transform module to process signals to provide one or more video files, and a codec decoder module including a motion predictor module, an inverse quantization module, and an inverse transform module to process signals corresponding to video information.

A second aspect of the invention is directed to a method of encoding video data. The method include motion estimating video data of at least a portion of at least one frame, transforming video data of at least a portion of at least one frame, and quantizing video data of at least a portion of at least one frame.

A third aspect of the invention is directed to a method of decoding video data. The method includes motion predicting video data of at least a portion of at least one frame, inverse quantizing video data of at least a portion of at least one frame, and inverse transforming video data of at least a portion of at least one frame.

Some or most supported functions can be performed concurrently in one embodiment of the invention. Various other aspects, alternative embodiments, and alternative features of the invention are described in further detail below. The foregoing, together with other aspects of this invention, will become more apparent when referring to the following specification, claims, and accompanying drawings.

DESCRIPTION OF THE SPECIFIC EMBODIMENTS

The invention provides a method and a system to encode and decode video data in various video systems, which could be used in either wired or wireless systems that provide audio and/or video information. Various embodiments of the invention can be applied to communication applications, biological applications, medical applications, electronic applications, and any other applications where such methods and systems can be beneficially used. However, the scope of the invention should not be considered to be limited only to systems in accordance to these technical specifications. Certain embodiments of the invention are also applicable to other data transmission technologies, using cable communications, and other wired and wireless communications.

The present invention includes various operations and/or modules, which will be described below. The operations of the present invention may be performed by hardware components or may be embodied in machine-executable instructions, which may be used to cause a general-purpose or special-purpose processor programmed with the instructions to perform the operations. In certain embodiments, the method may be performed by processing logic that may comprise hardware (e.g., dedicated logic, programmable logic, microcode, or an equivalent), software (such as run on a general purpose computer system, a dedicated machine, or an equivalent data processing system), or a combination of both hardware and software modules.

The present invention may be provided as a computer program product, or software, that may include a machine-readable medium having stored thereon instructions, which may be used to program a computer system (or other equivalent data processing systems or electronic devices) to perform a process according to the present invention. A machine-readable medium includes any mechanism for storing or transmitting information in a form (e.g., software, processing application) readable by a machine (e.g., a computer, or an equivalent data processing system or electronic device). The machine-readable medium may includes, but is not limited to, magnetic storage medium (e.g., floppy diskette); optical storage medium (e.g., CD-ROM, DVD, or an equivalent); magneto-optical storage medium; read only memory (ROM); random access memory (RAM); erasable programmable memory (e.g., EPROM, EEPROM, or an equivalent); flash memory; electrical, optical, acoustical or other form of propagated signal (e.g., carrier waves, infrared signals, digital signals, or an equivalent); or other type of medium suitable for storing electronic instructions. The present invention may also be practiced in distributed computing environments where the machine-readable medium is stored on and/or executed by more than one data processing system.

Example System Application

Figure 1:
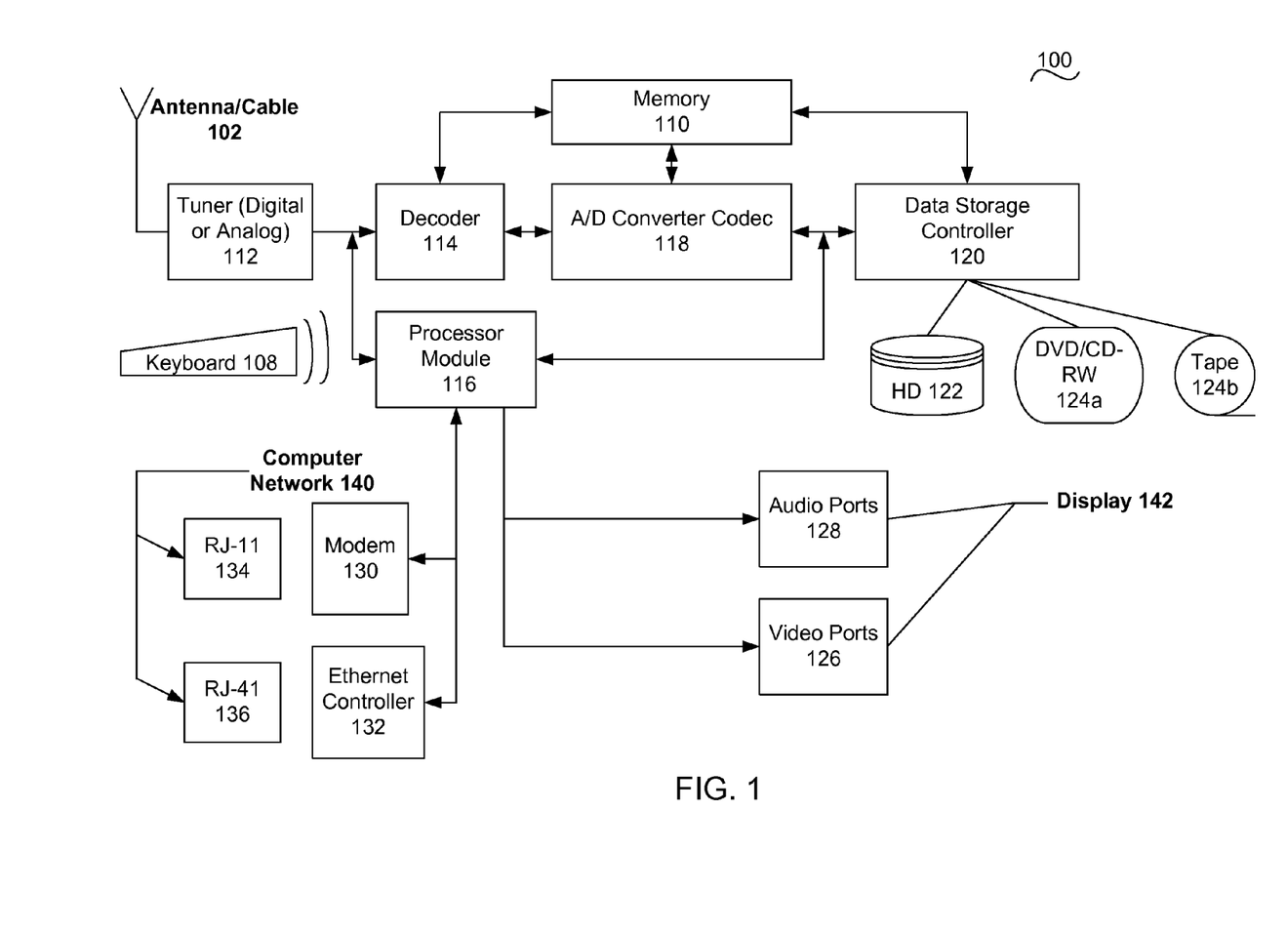
FIG. 1 is a block diagram of a personal video recording/storage system, in accordance with one preferred embodiment of the invention.

FIG. 1 is a block diagram of a personal video recording/storage system 100, in accordance with an embodiment of the invention. As illustrated in FIG. 1, system 100 includes a tuner 112 (e.g., a TV tuner, or a cable-ready TV tuner) that can receive signals from both analog and digital sources such as, a cable system, a Digital Broadcast Satellite (DBS) system, an antenna, or a terrestrial broadcast TV system, and/or some other equivalent source through an antenna or cable 102. These systems are typically compatible with one or more applicable video broadcast standards in the U.S. and abroad. System 100 also includes a wireless keyboard 108 (e.g., an infrared keyboard), a memory 110, a decoder 114, a processor module 116, an analog-to-digital converter Codec 118, a data storage controller 120, a disk drive 122, a R/W DVD or R/W CD drive 124a, a tape drive 124b, one or more video ports 126, one or more audio ports 128, one or more modems 130, one or more Ethernet controllers 132, one or more RJ-11 jacks 134, and one or more RJ-45 jacks 136 connected to a computer network 140 (e.g., the Internet or another equivalent computer network).

Tuner 112 receives and processes an input signal and extracts video information transmitted on the receive signal. Depending on the particular type of signal being received (i.e., whether the received signal is digital or analog in nature), tuner 112 provides either an analog signal or digital data containing the extracted video information. The analog signal is provided to a processor module 116, and the digital video data is provided to a decoder 114.

Decoder 114 receives and decodes (i.e., decompresses) the video data and provides a decoded file. In one preferred embodiment of the invention, decoder 114 decodes video data in some standard format (e.g., MPEG-2, MPEG-4, or another version of MPEG, or Video for Windows, or Indeo, or Quick-Time) as necessary. The decoded file may be provided to a coder/decoder (Codec) 118 for compression and recording. In one preferred embodiment of the invention, decoder 114 further provides decoded analog or digital signals to processor module 116.

In one preferred embodiment of the invention, processor module 116 further processes (e.g., conditions) the analog signal received from tuner 112 or decoder 114. Processor module 116 then provides the signals to a display 142 (e.g., a standard television set, a high-definition television set, flat panel display, or an equivalent), and speakers via video ports 126 and audio ports 128, respectively. In one embodiment, processor module 114 includes a processor that determines how the signal is to be processed. How the signal is processed may be dependent on the current user selection in the form of commands and on a preprogrammed set of commands. For example, a user may have programmed the system to record a movie, but the user still wants to watch a game in instant playback mode.

In one preferred embodiment of the invention, Codec 118 encodes (i.e., compresses) the video file from decoder 114 using a user-selectable Codec algorithm. For example, in one preferred embodiment of the invention, motion video is compressed using an MPEG-2 encoding algorithm, and still images are compressed using a Digital Video (DV) encoding algorithm, or an equivalent algorithm is used (e.g., MPEG-2, MPEG-3, or MPEG-4, or a competing algorithm previously listed). The compressed file is then provided to a data storage controller 120 and stored to either a fixed media storage device 122 (e.g., a disk drive), or a removable media storage device (e.g., a removable magnetic disk drive, a re-writable CD device 124a, a re-writable DVD device 124a, or a tape drive 124b, or some other removable storage device).

In various embodiments of the invention, the signal from tuner 112 can be digital or analog. Consequently, signals that are not in digital form are digitized in order to be recorded on a storage device such the fixed media storage device 122.

In one embodiment of the invention, decoder 114 also receives and processes (decompresses) video files from either the fixed or removable media storage device for viewing on demand. In one preferred embodiment of the invention, commercially available MPEG-2 decoders implemented in silicon form are used to decode digital TV and DVD input signals. On playback, a video file is decompressed using the same algorithm used to compress the files for recording. Once decompressed, the file is provided to a display 142 for viewing.

In one embodiment of the invention, a memory unit 110 is used to temporarily store video files, which may be designated for storage to the storage devices, or designated for processing by Codec 118 and/or decoder 114. In one preferred embodiment of the invention, memory unit 110 is also used to store software modules. In one preferred embodiment of the invention, these software modules include compression and decompression software to be executed by Codec 118, and other software modules (e.g., a user interface module) to be executed by a processor within processor module 116.

In one embodiment of the invention, system 100 supports the capability of stopping live video, as well as instant replay with selectable replay time interval. System 100 may also be designed with the capability to download video files and data contents from a computer network 140 (e.g., the Internet). In that case, system 100 is equipped with a (e.g., built-in) modem 130 and/or an Ethernet controller 132 and support software that enables the user to access the computer network 140 (e.g., the Internet and email services), as well as download video files.

Codec Encoder Core

The Encoder core is a fully dedicated video compression engine capable of supporting a maximum of proprietary video standards. The core reads a video frame from memory and outputs an encoded bit stream (and decoded reference picture) back to memory.

In one embodiment of the invention, host processor requirements are minimal (e.g., specifying the frame locations and coding options) that typically would need to be programmed once at the beginning of each frame.

In one embodiment of the invention, the core requires a single memory component. The core shares system memory with the host and capture components with no loss of performance.

In one embodiment of the invention, the core is configured with the VLE (Variable Length Encoding) performed in software. In this configuration the output bit stream conforms to a proprietary system, or a H.263 and MPEG4 short header standard. In another embodiment, this can be replaced with a component supporting an alternative standard or profile depending on the customer requirements.

Various embodiment of the invention also supply a range of software encoder and decoders, drivers and applications to implement RTP (Real Time Protocol) based video streaming for various platforms and OS. These may be optionally integrated into a customer's product along with this IP (Internet Protocol) core.

Technical Specification

TABLE 1

| | |
|---|---|
| Throughput | CIF: 352 × 288 × 30 FPS @ 16 MHz |
| | PAL: 704 × 576 × 25 fps @ 50 MHz |
| | NTSC: 720 × 480 × 30 fps @ 60 MHz |
| Integer Pixel Search Engine | Biased +/− 16 H × 8 V Pixel Log Search |
| Half Pixel Search Engine | Biased +/− ½ H × ½ V Pixel Full Search |
| Quantization | Flat Biased Programmable Quantization module |
| Other | >3 × Frame Size |

Standards Supported

In one embodiment of the invention, the core supports a variable length encoder component for proprietary systems, or a H.263 and MPEG4 short header. MPEG4 simple and advanced simple profile will be offered as options. Other standards and profiles consistent with the coder structure (e.g., MPEG-2) can be supported on request.

Functional Description

Figure 2:
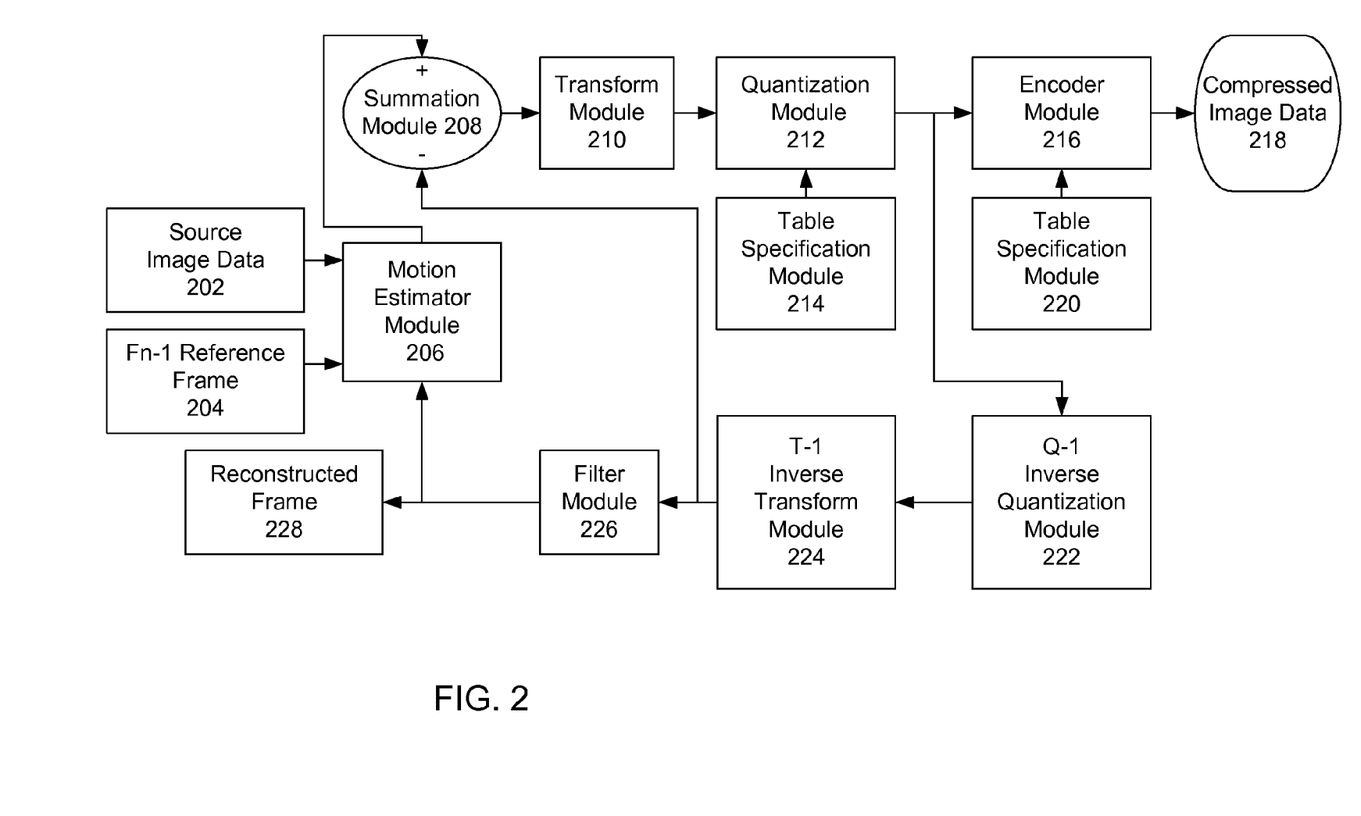
FIG. 2 illustrates the main components that make up the Encoder core, according to one embodiment of the invention.

FIG. 2 illustrates the main components that make up the Encoder core, according to one embodiment of the invention. These are the motion estimator (ME) module 206, transform module (T) 210, and quantization module (Q) 212. FIG. 2 illustrates the uncompressed source image data 202, the previously encoded frame(s) Fn-1 reference frame 204, the motion estimator 206, the summation module 208, the forward transform module 210, the quantization module 212, the table specification module 214, the encoder module 216, the table specification module 220, the compressed image data 218, the inverse quantization module 222, the inverse transform module 224, the filter module 226, and the reconstructed frame 228.

The motion estimator module 206 receives the source image data 202 and the reference frame 204, and the reconstructed frame 228, and produces an input to the summation module 208, which produces an output to the forward transform module 210. The output of the forward transform module 210 and the table specification module 214 are inputs to the quantization module 212, whose output is coupled to the encoder module 216 and the inverse quantization module 222. The output of the inverse quantization module 222 is coupled to the inverse transform module 224, whose output is coupled to the summation module 208 and the filter module 226. The output of the filter module 226 is coupled to the motion estimator module 206 and the reconstructed frame 228.

In one embodiment of the invention, the Encoder core is composed from several pipelined components that process macro-block size chunks of data. Paged RAM banks separate these components, with the number of pages being chosen to ensure the correct data flow.

In one embodiment, there are five logical component groups operating in parallel. The first component is the integer pixel motion estimator. This component employs a center-biased (16×8) log search strategy and is composed from three simultaneously operating sum of absolute difference accumulator units operating on four pixels per cycle.

In one embodiment, the second component is the half pixel motion estimator. This employs a center biased (1×1) full search strategy. In one embodiment, it is again composed from three sums of absolute difference accumulator units. However, in this stage only one pixel per cycle is processed.

In one embodiment of the invention, the third component group is the forward transform path. In one embodiment of the invention, this is composed of predictor, forward transform module and forward quantization module components. In one embodiment of the invention, the transform module is implemented using a 1 bit per cycle bit serial architecture with 16 bits internal precision.

In one embodiment, the quantization module is a biased linear design, implemented using two pipelined multipliers, with a total internal precision of 12 bits. Exact details of the quantization module may vary between standards. The predictor unit subtracts the prediction formed by the motion estimator from the input data in P and B macro-blocks.

In one embodiment, the fourth component group composes the reverse transform path. This contains the inverse quantization module, the inverse transform module, and reconstruct components. In one embodiment of the invention, the inverse transform module is implemented using a distributed arithmetic approach with 16 bits ROM precision, but other precisions in other embodiments can be achieved with other numbers of bits, such as 32 bits, 64 bits or 128 bits, for example.

In one embodiment, the inverse quantization module, the exact details of which vary between standards, is implemented using a direct single stage multiplier. The reconstruct component adds the macro-block prediction to the inverse transformed error data to produce the final reconstructed output.

In one embodiment, the fifth and final component is the variable length encoder. In this implementation component outputs a stream conforming to the proprietary system, or a H.263/MPEG4 short header syntax. It can be replaced with a component conforming to an alternative (compatible) standard as required by the customer.

In one embodiment, the variable length encode is performed in software. In this case, the component simply copies the quantized coefficients unchanged, except for zigzag scanning directly to the output buffer. Also shown is an optional pre-processing stage (prep). This component may be populated with one or more of scaling, noise reduction, de-interlacing, motion-detection or other customer-defined image processing functionality.

In one embodiment of the invention, there are three sets of parameters. The first group of parameters includes the main control enable, reset, start and ready, which control the operation of the core. The second group of parameters includes the encoding parameters, which are divided into two sets. The first set specifies the address of the various frames used in encoding. The second group, height, width, and config., specify the actual encoding parameters. The required values should be established on these ports before encoding begins and held until encoding completes.

The final group of parameters deals with the external memory. For example, when the Encoder core requires the memory to begin transferring data. In one embodiment of the invention, in order to operate at full throughput the encoder core must be connected to an external memory component large enough to hold more than three frames of video. In one embodiment of the invention, the reconstructed and output frames may be overlapped. In one embodiment of the invention, these frames are used concurrently by different components. The host or capture component writes raw video frames to the first frame location with the host retrieving the previously encoded coefficients from another memory pointer.

In one embodiment of the invention, the encoder uses the remaining memory for holding the frame to be encoded, the previously reconstructed frame, the decoded or current reconstructed frame and the encoded coefficients. In one embodiment, when the Encoder completes processing a frame the various pointers are exchanged and the Encoder is restarted to process the captured frame.

In one embodiment, the frames are presented in a raster scanned Planar YCbCr 4:2:0 fashion (a component digital signal containing one luma and two chroma components Y=luma, Cb=blue, Cr=red), beginning at the top left hand corner of the frame and proceeding along the lines left to right first the luma frame Y is written to memory (y0, y1, y2, . . . ) and so on for Cb then Cr.

Memory Access

The Encoder core has flexible memory access requirements. In one embodiment, for each macro-block that is processed one input macro-block and three search area (reference) macro-blocks must be transferred from external memory into the internal buffers. Once encoded the decoded output and encoded coefficients are transferred to system memory.

Decoder Core Summary

In one embodiment of the invention, the Decoder core is a fully 30 dedicated video compression engine capable of supporting a proprietary or industry video standard. The core reads input bit streams (and reference picture) from memory and outputs a decoded picture back to memory.

In one embodiment of the invention, host processor requirements are minimal (specifying frame locations and coding options, etc) need be programmed once at the beginning of each frame. In one embodiment of the invention, the core requires a single memory component, one preferably clocked at the same speed as the core itself. The core can generally share this memory with the host or render components with no loss of performance.

In one embodiment of the invention, the variable length decode stage may be implemented in software and implement a proprietary or industry H.263 and MPEG4 short header standard. This component can be replaced with a component supporting an alternative standard or profile depending on the customer requirements.

One embodiment of the invention can also supply a range of software encoder and decoders, drivers and applications to implement RTP based video streaming for various platforms and OS. These may be optionally integrated into a customer's product along with this IP core.

Technical Specification

TABLE 2

| Throughput | CIF: 352 × 288 × 30 FPS @ 16 MHz |
| --- | --- |
|  | PAL: 704 × 576 × 25 fps @ 50 MHz |
|  | NTSC: 720 × 480 × 30 fps @ 60 MHz |
|  | ATSC 1280 × 720 × 30 fps @ 60 MHz |
|  | ATSC 1920 × 1080 × 30 fps @ 60 MHz |
| Quantization | Flat Biased Programmable Quantization module |
| Other | >Frame Size |

Standards Supported

In one embodiment of the invention, the Decoder is capable of decoding a proprietary or industry H.263 baseline or MPEG4 short header compliant bit stream. In one embodiment of the invention, the decoder can perform MPEG4 simple and advanced simple decode. Other standards and profiles consistent with the codec structure (H.264, MPEG-2) can be supported on request.

Functional Description

Figure 3:
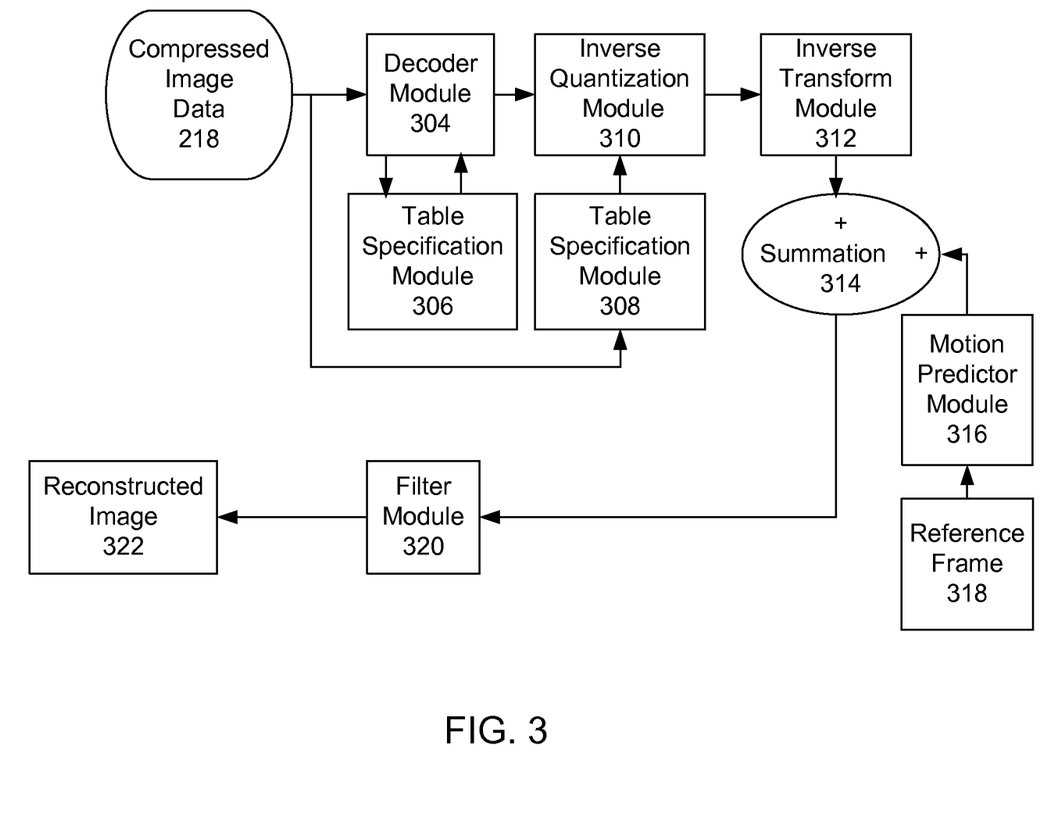
FIG. 3 illustrates the main components that make up the Decoder core, according to one embodiment of the invention.

FIG. 3 illustrates a block diagram of the main components that make up the Decoder core, according to one embodiment of the invention. These are the motion predictor (MP) module 316, inverse transform ($T^{-1}$) module 312, and inverse quantization ($Q^{-1}$) module 310. FIG. 3 illustrates the compressed data 218, the decoder module 304 and the table specification 306, the inverse quantization module 310 and the table specification 308, the inverse transform module 312, the summation module 314, the motion predictor 316, the reference frame Fn-1 318, the filter module 320, and the reconstructed image 322.

The compressed image data 218 is an input to the decoder 304 and to the table specification 308 of the inverse quantization module 310. The reference frame Fn-1 318 is an input to the motion predictor 316. The output of the inverse transform module 312 and the output of the motion predictor 316 are inputs to the summation module 314, whose output is coupled to the filter module 320, which produces the reconstructed image 322 to be viewed.

In one embodiment of the invention, the Decoder core is composed from several pipelined components that process macro-block size chunks of data. Paged RAM banks separate these components, with the number of pages being chooses to ensure the correct data flow.

In one embodiment of the invention, there are three logical component groups operating in parallel. The first is the half pixel motion reconstruction unit. This is the counterpart of the half pixel motion estimator in the encoder.

In one embodiment of the invention, the second component group composes the reverse transform path. This contains the inverse quantization module, the inverse transform module and reconstruct components. The inverse transform module, which is IEEE compliant, is implemented using a distributed arithmetic approach with 16 bit ROM precision, but other precisions in other embodiments can be achieved with other numbers of bits, such as 32 bits, 64 bits or 128 bits, for example. In one embodiment of the invention, the inverse quantization module is implemented using a direct single stage multiplier. The reconstruct component adds the macro-block prediction to the inverse transformed error data to produce the final reconstructed output.

In one embodiment of the invention, the third and final component is the variable length decoder. This component simply copies quantized coefficients unchanged, except for inverse zigzag scanning directly from the input buffer to the coefficient memory.

In one embodiment of the invention, these components process a stream conforming to a proprietary or industry standard, such as the H.263/MPEG4 short header syntax. In one embodiment of the invention, a component can be replaced with a component conforming to an alternative (compatible) standard as required by the customer.

In one embodiment of the invention, in order to operate at full throughput the decoder core must be connected to an external memory component large enough to hold more than three frames of video. In one embodiment of the invention, the decoded frames are returned in a raster scanned Planar YCbCr 4:2:0 fashion. This begins at the top left hand corner of the frame and proceeding along the lines left to right first the luma frame Y is written to memory (y0, y1, y2, . . . ) and so on for Cb then Cr.

Memory Access

In one embodiment of the invention, the Decoder core has some flexibility in its memory access requirements. For each macro-block that is generated one extended search macro-block and one coefficient block is loaded from external memory.

In one embodiment of the invention, note that at one transfer per cycle the core uses only (approx. 96 transfer/macro×2 macro+188×1) 380 of the available 1316 bus cycles for its own operation. And the core is clocked at or above (1316 cycles×396 macro/frame×30 frames/sec) 16 MHz for CIF @ 30 FPS.

In one embodiment of the invention, the Decoder core renegotiates the use of the bus between each macro-block transfer. Exact timing depends on the external memory.

Figure 4:
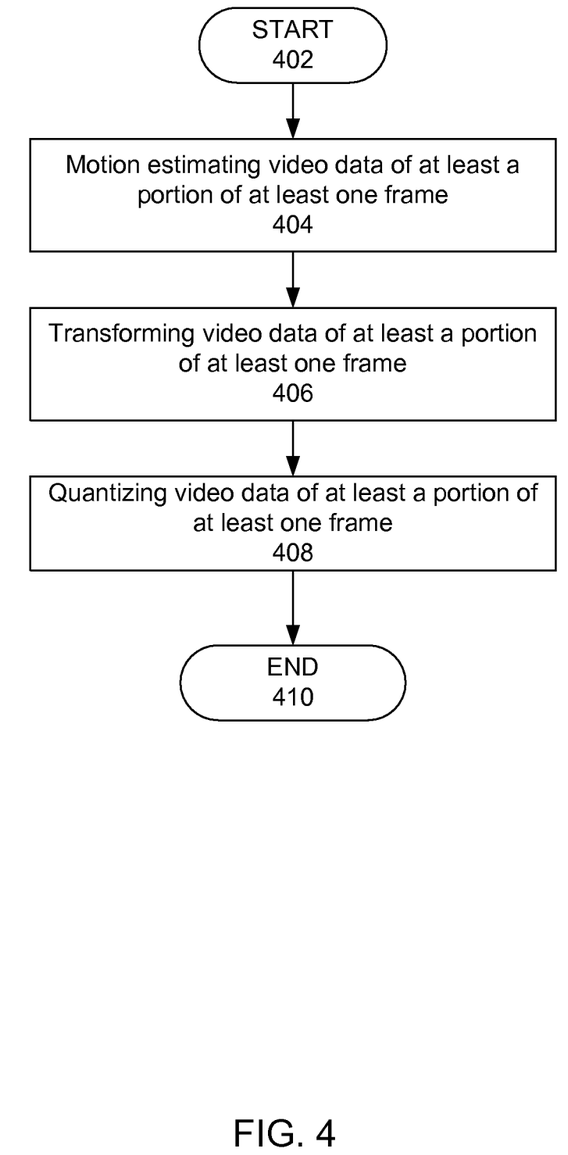
FIG. 4 is a flow chart for implementing an encoding, in accordance with one preferred embodiment of the invention.

FIG. 4 is a flow chart for implementing an encoding of video data, in accordance with one preferred embodiment of the invention. The method starts in operation 402, and is followed by operation 404. Operation 404 is next and includes motion estimating video data of at least a portion of at least one frame. Operation 406 is next and includes transforming video data of at least a portion of at least one frame. Operation 408 is next and includes quantizing video data of at least a portion of at least one frame. The method ends in operation 410.

Figure 5:
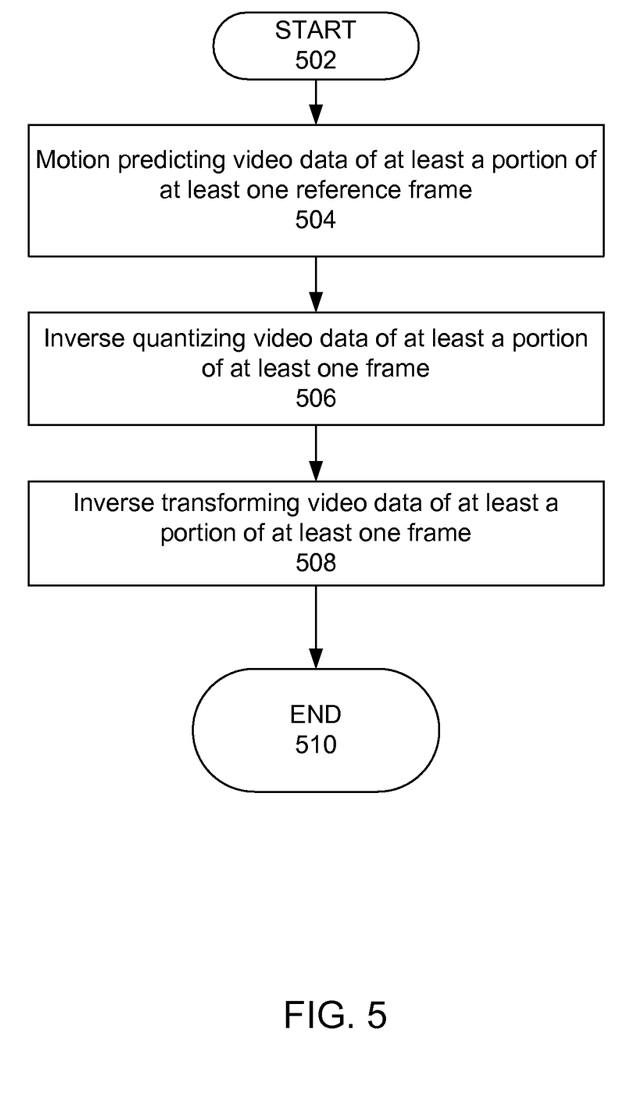
FIG. 5 is a flow chart for implementing a decoding, in accordance with another preferred embodiment of the invention.

FIG. 5 is a flow chart for implementing a decoding of video data, in accordance with one preferred embodiment of the invention. The method starts in operation 502, and is followed by operation 504. Operation 504 is next and includes motion predicting video data of at least a portion of at least one reference frame. Operation 506 is next and includes inverse quantizing video data of at least a portion of at least one frame. Operation 508 is next and includes inverse transforming video data of at least a portion of at least one frame. The method ends in operation 510.

Figure 6:
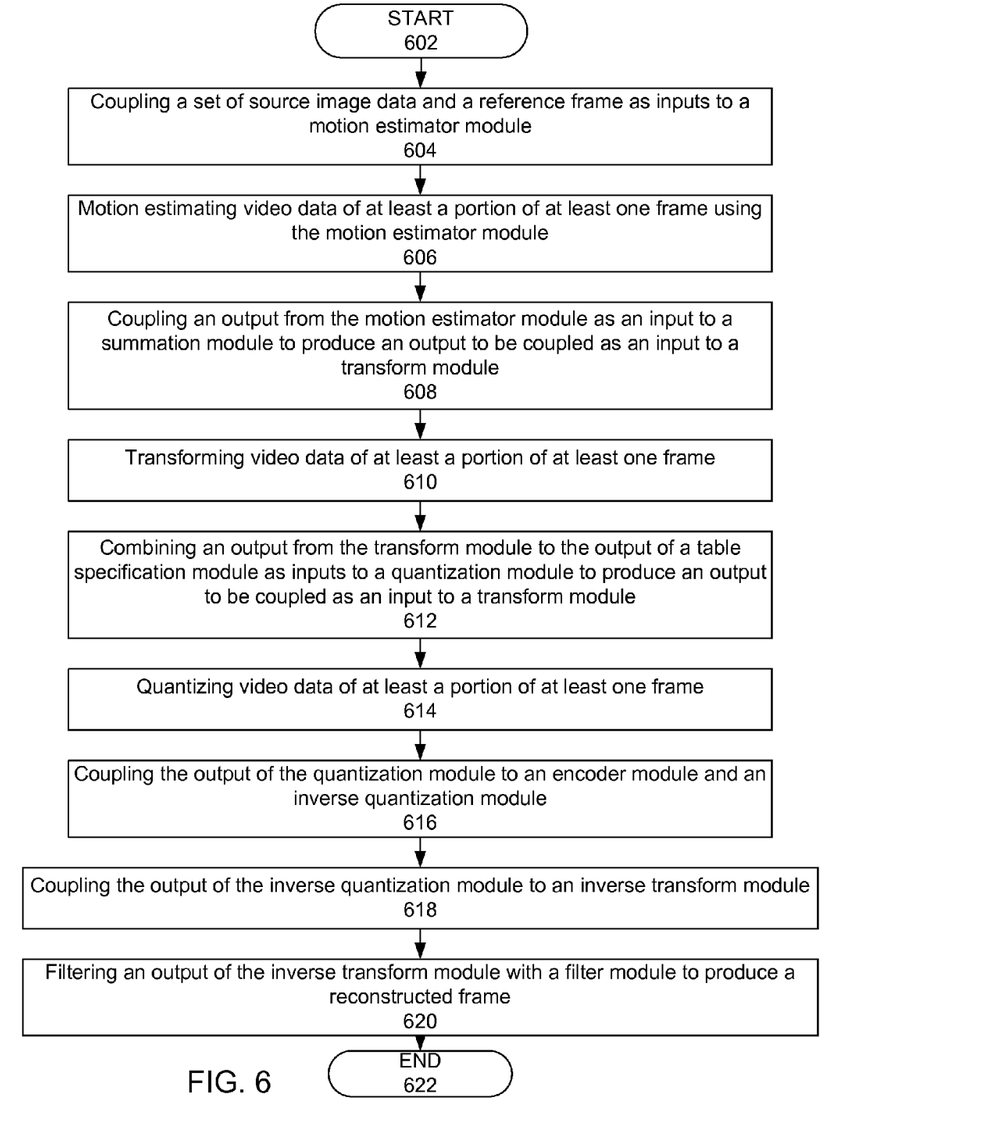
FIG. 6 is a flow chart for implementing an encoding, in accordance with another embodiment of the invention.

FIG. 6 is a flow chart for implementing an encoding of video data, in accordance with another embodiment of the invention. The method starts in operation 602, and is followed by operation 604. Operation 604 is next and includes coupling a set of source image data and a reference frame as inputs to a motion estimator module. Operation 606 is next and includes motion estimating video data of at least a portion of at least one frame using the motion estimator module. Operation 608 is next and includes coupling an output from the motion estimator module as an input to a summation module to produce an output to be coupled as an input to a transform module. Operation 610 is next and includes transforming video data of at least a portion of at least one frame. Operation 612 is next and includes combining an output from the transform module to the output of a table specification module as inputs to a quantization module to produce an output to be coupled as an input to a transform module. Operation 614 is next and includes quantizing video data of at least a portion of at least one frame. Operation 616 is next and includes coupling the output of the quantization module and an inverse quantization module. Operation 620 is next and includes filtering an output of the inverse transform module with a filter module to produce a reconstructed frame. Operation 618 is next and includes coupling the output of the inverse quantization module as an input to an inverse transform module. Operation 620 is next and includes filtering an output of the inverse transform module with a filter module to produce a reconstructed frame. The method ends in operation 622.

Figure 7:
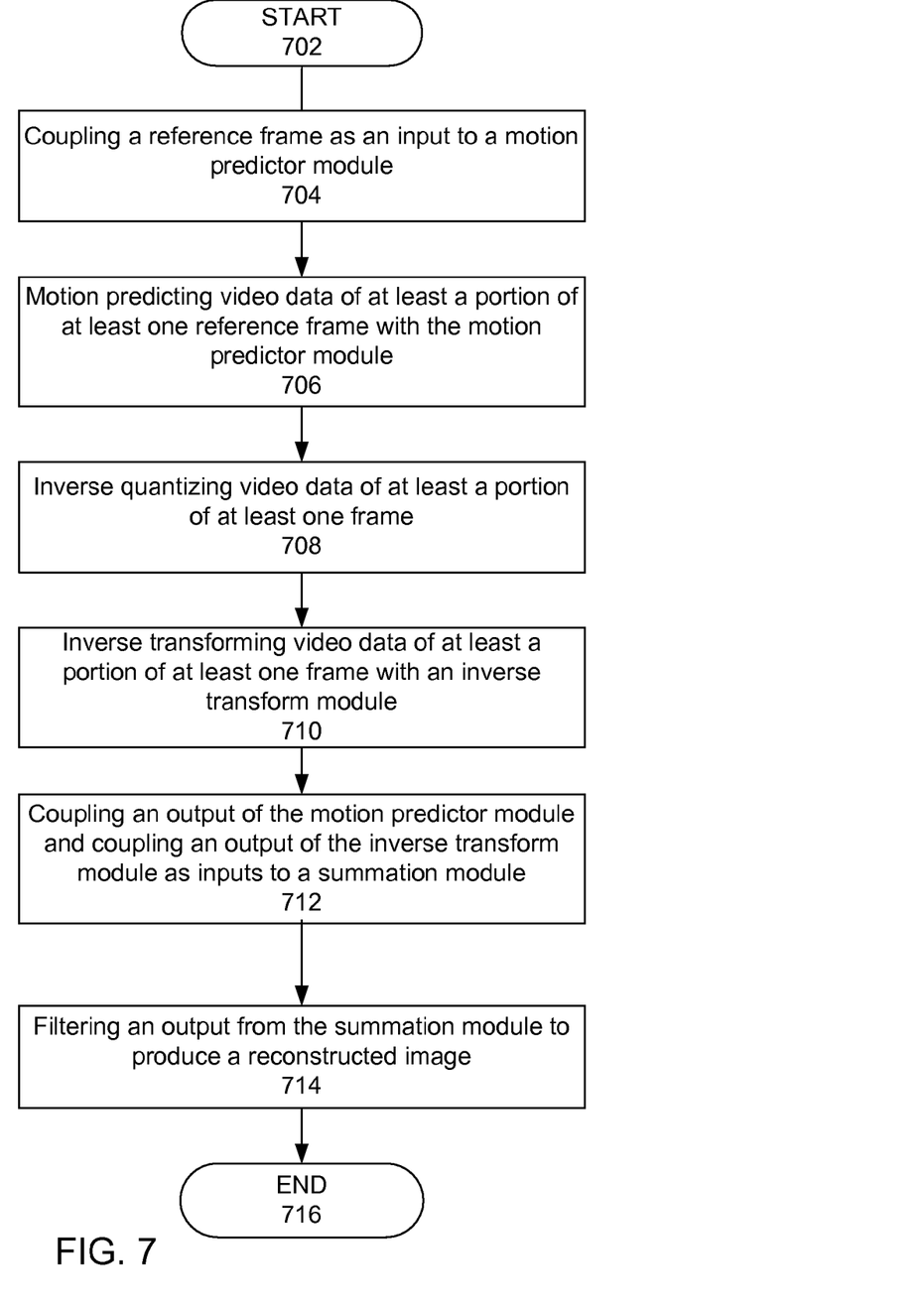
FIG. 7 is a flow chart for implementing a decoding, in accordance with another embodiment of the invention.

FIG. 7 is a flow chart for implementing a decoding of video data, in accordance with one preferred embodiment of the invention. The method starts in operation 702, and is followed by operation 704. Operation 704 is next and includes coupling a reference frame as an input to a motion predictor module. Operation 706 is next and includes motion predicting video data of at least a portion of at least one reference frame using the motion predictor module. Operation 708 is next and includes inverse quantizing video data of at least a portion of at least one frame. Operation 710 is next and includes inverse transforming video data of at least a portion of one frame using an inverse transform module. Operation 712 is next and includes coupling an output of the motion predictor module and coupling an output of an inverse transform module as inputs to a summation module. Operation 714 is next and includes filtering an output of the summation module to produce a reconstructed image. The method ends in operation 716.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments illustrated herein but is to be accorded the widest scope consistent with the principles and novel features disclosed herein, and as defined by the following claims.

What is claimed is:

1. A codec system comprising:
    a codec encoder including an encoder module, a motion estimator module, a quantization module, and a transform module to process signals to provide one or more video files, wherein the encoder module, motion estimator module, quantization module and transform module each use one or more hardware processors specifically programmed with software to implement the encoder module, motion estimator module, quantization module and transform module, and wherein the encoder module receives one or more outputs from a first table specification module and the quantization module receives one or more outputs from a second table specification module; and
    a codec decoder including a decoder module, a motion predictor module, an inverse quantization module, and an inverse transform module to process signals corresponding to video information, wherein the decoder module, motion predictor module, inverse quantization module and inverse transform module each use the one or more hardware processors specifically programmed with software to implement the decoder module, motion predictor module, inverse quantization module and inverse transform module,
    wherein the codec encoder further comprises a set of modules comprising: an integer pixel motion estimator module, a half pixel motion estimator module, a forward transform module group, a reverse transform module group, and a variable length encoder module, wherein all the modules in the set of modules operate concurrently.

2. The codec system of claim 1, further comprising:
    a summation module to produce an output to be coupled as an input to the transform module, wherein the summation module uses the one or more hardware processors specifically programmed with software to implement the summation module; and
    a filter to produce an output to be coupled as an input to the motion estimator module, wherein the filter is implemented on the one or more hardware processors specifically programmed with software to implement the filter.

3. The codec system of claim 1, wherein the decoder module is coupled to a tuner, wherein the decoder module is configured to receive and decode video data from the tuner to provide a decoded file.

4. The codec system of claim 3, wherein the decoder module is configured to receive and process video files from a media storage device.

5. The codec system of claim 3, wherein the decoder module is configured to receive and process video files from a computer network.

6. The codec system of claim 1, further comprising a processor to process analog signals and provide signals to a display.

7. The codec system of claim 1, wherein analog signals are digitized in order to be recorded on a storage device.

8. The codec system of claim 1, wherein at least two modules share the use of a common memory.

9. A method for encoding video data, comprising:
motion estimating video data of at least a portion of at least one frame using a motion estimating module, wherein the motion estimating includes using one or more hardware processors specifically programmed with software to implement the motion estimating;
transforming the video data of the portion of the at least one frame using a transform module, wherein the transforming includes using the one or more hardware processors specifically programmed with software to implement the transforming of the video data;
quantizing the video data of the portion of the at least one frame using a quantization module, wherein the quantizing includes using the one or more hardware processors specifically programmed with software to implement the quantizing of video data, wherein a codec encoder module receives one or more outputs from a first table specification module and the quantization module receives one or more outputs from a second table specification module,
wherein encoding the video data further comprises performing operations of integer pixel motion estimating, half pixel motion estimating, forward transforming, reverse transforming, and variable length encoding, wherein all the operations are performed concurrently.

10. The method of claim 9, further comprising:
using a set of source image data and a reference frame as inputs to the motion estimating module;
using an output from the motion estimating module as an input to a summation module to produce an output to be used as an input to the transform module;
combining an output from the transform module to the one or more outputs of the second table specification module to produce an input to the quantization module;
using an output of the quantization module as an input to the codec encoder module and an inverse quantization module; and
filtering an output from the inverse transform module with a filter module to produce a reconstructed frame and produce an output to be used as an input to the motion estimator module.

11. The method of claim 9, wherein at least two of the operations selected from the set of operations consisting of: motion estimating, transforming and quantizing are performed concurrently.

12. The method of claim 9, wherein at least two of the operations of motion estimating video data, transforming video data, and quantizing video data, are performed by sharing a common memory.

13. A method for encoding and decoding video data, comprising:
motion estimating video data of at least a portion of at least one frame using a motion estimating module, wherein the motion estimating includes using one or more hardware processors specifically programmed with software to implement the motion estimating;
transforming the video data of the portion of the at least one frame using a transform module, wherein the transforming includes using the one or more hardware processors specifically programmed with software to implement the transforming of the video data;
quantizing the video data of the portion of the at least one frame using a quantization module, wherein the quantizing includes using the one or more hardware processors specifically programmed with software to implement the quantizing of video data, wherein a codec encoder module receives one or more outputs from a first table specification module and the quantization module receives one or more outputs from a second table specification module, wherein encoding the video data further comprises performing operations of integer pixel motion estimating, half pixel motion estimating, forward transforming, reverse transforming, and variable length encoding, wherein all the operations are performed concurrently;
motion predicting video data of at least a portion of at least one frame, wherein this operation includes using the one or more decoding processors specifically programmed with software to implement the motion predicting;
inverse quantizing video data of at least a portion of at least one frame, wherein this operation includes using the one or more decoding processors specifically programmed with software to implement the inverse quantizing, and wherein a codec decoder module receives one or more outputs from a first table specification module and an inverse quantization module receives one or more outputs from a second table specification module; and
inverse transforming video data of at least a portion of at least one frame, wherein this operation includes using the one or more decoding processors specifically programmed with software to implement the inverse transforming of video data.

14. The method of claim 13, further comprising:
coupling a reference frame as an input to a motion predictor module;
coupling an output of the motion predictor module and coupling an output of an inverse transform module as inputs to a summation module; and
filtering an output from the summation module to produce a reconstructed image.

15. The method of claim 13, wherein at least one of the following operations consisting of: motion predicting, inverse transforming and inverse quantizing are performed using software.

16. The method of claim 13, wherein at least two of the operations selected from the set of operations consisting of: motion predicting, inverse transforming and inverse quantizing are performed concurrently.

17. The method of claim 13, wherein at least two of the operations consisting of: motion predicting video data, inverse quantizing video data, and inverse transforming video data are performed by sharing a common memory.

18. The method of claim 13, wherein the method for encoding and decoding video data is implemented by a decoder module that can decode more than one type of industry standard compliant bit stream.

* * * * *